United States Patent [19]

Morimoto et al.

[11] Patent Number: 5,017,519

[45] Date of Patent: May 21, 1991

[54] TRANSPARENT AND NONEXPANSIVE GLASS-CERAMIC

[75] Inventors: Shigeki Morimoto, Mie; Kenji Sugiura, Matsusaka, both of Japan

[73] Assignee: Central Glass Company, Limited, Ube, Japan

[21] Appl. No.: 512,366

[22] Filed: Apr. 23, 1990

[30] Foreign Application Priority Data

Apr. 28, 1989 [JP] Japan .................................. 1-111442

[51] Int. Cl.$^5$ ............................................. C03C 10/12
[52] U.S. Cl. ............................................ 501/7; 501/4; 501/68; 501/69; 501/72
[58] Field of Search ...................... 501/4, 7, 68, 69, 72

[56] References Cited

U.S. PATENT DOCUMENTS

| | | | |
|---|---|---|---|
| 3,157,522 | 11/1964 | Stookey | 501/7 |
| 3,241,985 | 3/1966 | Kuwayama | 501/7 |
| 3,252,811 | 5/1966 | Beall . | |
| 3,380,818 | 4/1968 | Smith | 501/7 X |
| 4,018,612 | 4/1977 | Chyung | 501/4 |
| 4,507,392 | 3/1985 | Rittler | 501/4 |

FOREIGN PATENT DOCUMENTS 64-52631 2/1989 Japan .

*Primary Examiner*—Karl Group
*Attorney, Agent, or Firm*—Fleit, Jacobson, Cohn, Price, Holman & Stern

[57] ABSTRACT

A transparent and colorless glass-ceramic containing crystals of β-quartz and β-eucryptite is obtained by heat-treating a glass essentially composed of 63-69 wt % of $SiO_2$, 18-22 wt % of $Al_2O_3$, 3-5 wt % of $Li_2O$, 1-3 wt % of MgO, 4-6 wt % of $ZrO_2$, 0-2 wt % of ZnO, 0-2 wt % of $P_2O_5$, 0-2 wt % of $Na_2O$, 0-2 wt % of BaO and 0.3-1 wt % of $As_2O_3$, with proviso that the proportion of $ZrO_2$ to $SiO_2$ is not lower than a specified level and that the molar ratio of $Al_2O_3$ to the total of $Li_2O$, MgO and ZnO is within a specified range. The thermal expansion coefficient of this glass-ceramic is very close to zero over the range from room temperature to about 300° C.

4 Claims, 1 Drawing Sheet

TRANSPARENT AND NONEXPANSIVE GLASS-CERAMIC

BACKGROUND OF THE INVENTION

This invention relates to a colorless, transparent and nearly nonexpansive glass-ceramic which uses a $SiO_2$-$Al_2O_3$-$Li_2O$ base glass with addition of $ZrO_2$ as a nucleating agent and contains fine crystals of $\beta$-quartz and $\beta$-eucryptite.

There are various uses for transparent glass-ceramics, and accordingly there are various proposals of glass-ceramics high in transparency.

JP No. 36-15172 shows producing a transparent glass-ceramic by using a $SiO_2$-$Al_2O_3$-$Li_2O$ base glass with addition of $TiO_2$ as a nucleating agent, and there are other proposals of using $TiO_2$ or a combination of $TiO_2$ and $ZrO_2$ as a nucleating component for prducing transparent glass-ceramics. However, the inclusion of $TiO_2$ results in yellowish or brownish coloring of the obtained glass-ceramics. Transparent but colored glass-ceramics are not suitable for use in heat-resistant monitoring windows, aircraft windshields, electronic device substrates, etc.

JP No. 42-21357 proposes to produce a transparent and colorless or slightly whitish glass-ceramic by adding 2-15 wt % of $ZrO_2$ to a glass composition composed of $SiO_2$, $Al_2O_3$ and at least one of MgO, $Li_2O$ and ZnO. However, glass-ceramics according to this proposal generally exhibit considerable thermal expansion and are not always very high in transparency.

JP-A No. 64-52631 proposes to use a combination of $ZrO_2$ and $SnO_2$ as a nucleating component for producing a glass-ceramic using a $SiO_2$-$Al_2O_3$-$Li_2O$ base glass. However, the addition of $SnO_2$ is liable to cause precipitation of coarse crystals which render the glass-ceramic cloudy or opaline. Besides, when $SnO_2$ is used the heat treatment of the glass for crystallization requires a very strict and intricate control technique.

SUMMARY OF THE INVENTION

It is an object of the present invention to provide a glass-ceramic which is colorless, very transparent, high in heat resistance and close to zero in thermal expansion coefficient over a fairly wide range extending upward from room temperature.

The present invention provides a transparent and nearly nonexpansive glass-ceramic, which comprises fine crystals of $\beta$-quartz and $\beta$-eucryptite crystallized from a glass and dispersed in a glass matrix provided by the uncrystallized part of the glass, the glass consisting essentially of, expressed as oxides, 63-69 wt % of $SiO_2$, 18-22 wt % of $Al_2O_3$, 3-5 wt % of $Li_2O$, 1-3 wt % of MgO, 4-6 wt % of $ZrO_2$, 0-2 wt % of ZnO, 0-2 wt % of $P_2O_5$, 0-2 wt % of $Na_2O$, 0-2 wt % of BaO and 0.3-1 wt % of $As_2O_3$ with the proviso that the inequalities (I) and (II) are both satisfied:

$$\log Z \geq 8.8 - 4.47 \log S \qquad (I)$$

where Z is the content (wt %) of $ZrO_2$ in the glass, and S is the content (wt %) of $SiO_2$ in the glass, $$0.9 \leq a/(p+q+r) \leq 1.1 \qquad (II)$$

where a is the molar fraction of $Al_2O_3$ in the glass, and p, q and r are molar fractions of $Li_2O$, MgO and ZnO in the glass, respectively.

A glass-ceramic according to the invention is obtained by melting and shaping a glass of the above specified composition and subjecting the shaped glass to a crystallizing heat treatment. Preferably the heat treatment is a two-stage treatment consisting of a nucleating treatment at 750°–800° C. and a crystallizing treatment at 800°–900° C.

In a glass-ceramic according to the invention the principal constituents of the crystal phase are $\beta$-quartz and $\beta$-eucryptite which is very resemblant to $\beta$-quartz in crystal structure and is represented by $Li_2O \bullet Al_2O_3 \bullet 2SiO_2$ (wherein $Li_2O$ can be substituted by MgO and/or ZnO).

In the present invention the basic glass composition is very strictly specified, and the amount of $ZrO_2$ used as a nucleating agent is limited within a very narrow range, viz. from 4 to 6 wt %. If the amount of $ZrO_2$ is less than 4 wt % the nucleating effect is insufficient. If the amount of $ZrO_2$ is more than 6 wt % it becomes difficult to well melt the glass composition without using a special technique, and it is likely that the obtained glass-ceramic assumes a whitish color.

A glass-ceramic according to the invention is colorless and very high in transparency. This glass-ceramic does not assume even a whitish or grayish color. As another important feature, this glass-ceramic has a thermal expansion coefficient (linear expansion coefficient) very close to zero and practically can be regarded as nonexpansive. In most cases the thermal expansion expansion coefficient of a glass-ceramic according to the invention is within the range of $0 \pm 5 \times 10^{-7}/°C$. over the range of temperature from room temperature to about 300° C. $\beta$-Eucryptite has a negative coefficient of thermal expansion and, hence, contributes toward nearing the expansion coefficient of the glass-ceramic to zero.

By virtue of little expansion, a glass-ceramic according to the invention can be accurately worked by either a machining tool or a laser beam without dimensional errors attributed to a rise in temperature. Therefore, glass-ceramics according to the invention are useful for substrates of electronic devices and important parts of precision devices or instruments including optical devices or instruments. Besides, these glass-ceramics are useful for heat-resistant monitoring windows, windshields of aircraft and other vehicles, cooking utensils, etc.

DESCRIPTION OF THE PREFERRED EMBODIMENTS

In the present invention it is essential to use a glass composition specified hereinbefore. The reasons for limiting the amount of $ZrO_2$ within the range from 4 to 6 wt % are already explained. The amounts of the other components are specified for the following reasons.

Figure 1:
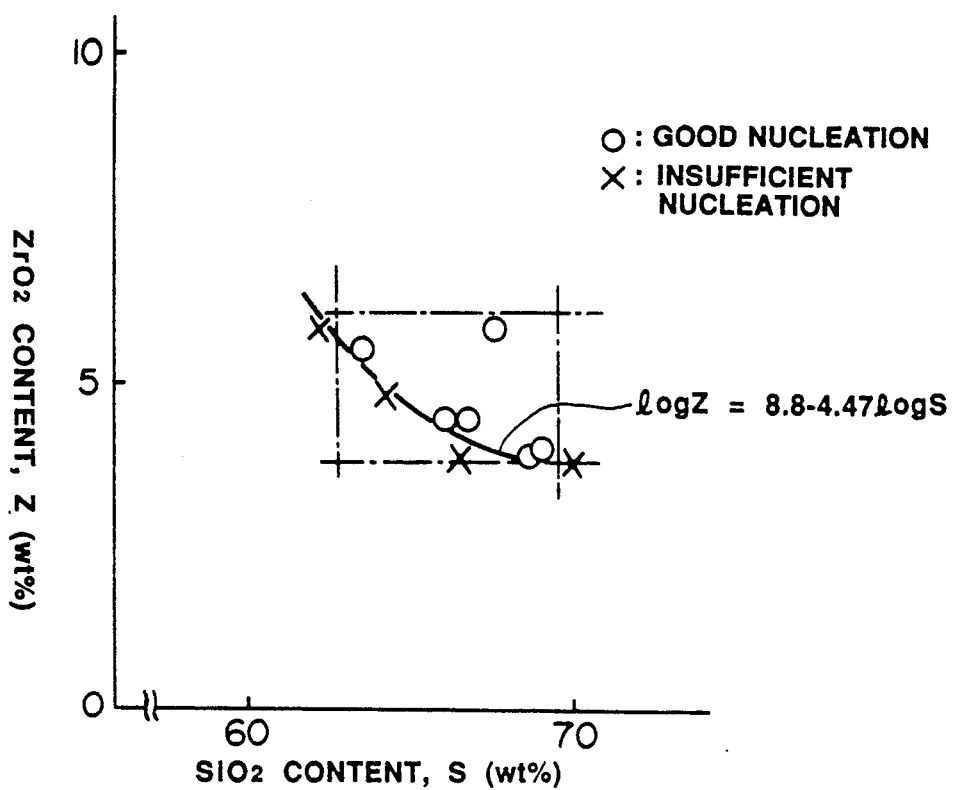
FIG. 1 is a graph showing the dependence of the nucleating effect of $ZrO_2$ added to a $SiO_2$-$Al_2O_3$-$Li_2O$ base glass on the proportion of $ZrO_2$ to $SiO_2$.

$SiO_2$ serves as both the primary material of the glass and the principal source of crystals of $\beta$-quartz and β-eucryptite. With respect to glass compositions fundamentally in accordance with the present invention, the graph of FIG. 1 shows the dependence of the degree of nucleation by heat treatment on the proportion of $ZrO_2$ to $SiO_2$ in the glass. The graph shows that good nucleation occurs when the glass contains 4-6 wt % of $ZrO_2$ and about 63-69 wt % of $SiO_2$. Furthermore, it is seen that good nucleation is ensured by making the proportion of the content of $ZrO_2$, Z (wt %), to the content of $SiO_2$, S (wt %), on or above the curve in broken line. This curve represents the equation $\log Z = 8.8 - 4.47 \log S$. Therefore, it is best to control the amounts of $ZrO_2$ and $SiO_2$ so as to satisfy the inequality $\log Z \geq 8.8 - 4.47 \log S$. Another reason for using a glass containing not more than 69 wt % of $SiO_2$ is that when the amount of $SiO_2$ exceeds 69 wt % there arises a problem as to the uniformity of the molten glass whereby the glass-ceramic is liable to exhibit whitish clouding.

$Al_2O_3$ is indispensable for forming crystals of β-eucryptite. If the amount of $Al_2O_3$ is less than 18 wt % the crystallization of β-eucryptite is insufficient, and the thermal expansion coefficient of the glass-ceramic increases. If the amount of $Al_2O_3$ is more than 22 wt % there arise difficulties in uniformly melting the glass and desirably shaping the molten glass.

$Li_2O$ too is necessary for crystallizing β-eucryptite, and the incusion of $Li_2O$ improves meltability of the glass. If the amount of $Li_2O$ is less than 3 wt % the glass composition may not easily be melted, and, moreover, the formation of β-eucryptite is insufficient. If the amout of $Li_2O$ is more than 5 wt % coarse crystal grains are liable to precipitate at the stage of crystallization, and hence it becomes difficult to obtain a transparent and colorless glass-ceramic.

If the amount of MgO is less than 1 wt % it is not always easy to uniformly melt the glass composition, and at the crystallizing stage there is a possibility of failure to precipitate uniformly fine crystal grains. MgO is expected to partially substitute for $Li_2O$ of β-eucryptite, but the presence of more than 3 wt % of MgO in the glass is unfavorable for heat resistance of the glass-ceramic and increases the expansion coefficient of the glass-ceramic.

The addition of ZnO improves meltability of the glass composition and is effective for precipitating fine crystal grains at the crystallizing stage and consequently enhancing the transparency of the glass-ceramic. Besides, together with MgO, ZnO substitutes for $Li_2O$ of β-eucryptite. However, the inclusion of more than 2 wt % of ZnO increases the expansion coefficient of the glass-ceramic and is unfavorable for heat resistance of the glass-ceramic. It is preferable that the glass composition contains at least 0.5 wt % of ZnO.

Figure 2:
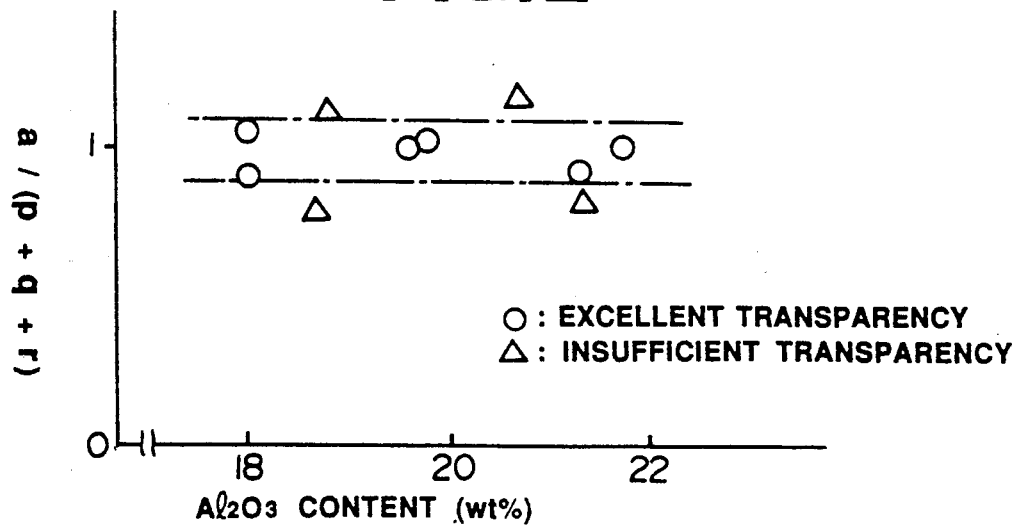
FIG. 2 is a graph showing the dependence of the degree of transparency of a glass-ceramic fundamentally in accordance with the present invention on the molar ratio of $Al_2O_3$ contained in the glass composition to the total of $Li_2O$, MgO and ZnO in the glass composition.

The molar ratio of $Al_2O_3$ to the total of $Li_2O$, MgO and ZnO is limited within a very narrow range as described hereinbefore. The main purpose of the limitation is for ensuring high transparency of the glass-ceramic. With respect to glass-ceramics fundamentally in accordance with the invention, the graph of FIG. 2 shows the dependence of the degree of transparency on the ratio of the molar fraction of $Al_2O_3$ (represented by a) in the glass, to the total of the molar fractions of $Li_2O$ (p), MgO (q) and ZnO (r) in the glass. It is seen that a glass-ceramic of very high transparency is obtained when the ratio $a/(p+q+r)$ is within the range from 0.9 to 1.1. Outside this range the glass-ceramic is liable to assume a slightly whitish color and tends to have a greater coefficient of thermal expansion and a lower resistance to heat.

BaO serves as a flux. Besides, the addition of BaO is effective for the precipitation of fine crystal grains and consequently for the enhancement of transparency of the glass-ceramic. However, the presence of more than 2 wt % of BaO in the glass tends to increase the expansion coefficient of the glass-ceramic and is unfavorable for heat resistance of the glass-ceramic. It is preferred that the glass composition contains at least 0.5 wt % of BaO.

$Na_2O$ serves as a flux, and the addition of $Na_2O$ improves formability of the glass. However, the addition of a large amount of $Na_2O$ causes a considerable increase in the expansion coefficient of the glass-ceramic and lowering of heat resistance of the glass-ceramic. To minimize such adverse effects, the content of $Na_2O$ is limited to 2 wt % at the maximum. It is possible to replace a portion of $Na_2O$ by $K_2O$.

The addition of $P_2O_5$ is effective for promoting melting of $ZrO_2$ contained in the glass composition, but when the content of $P_2O_5$ in the glass exceeds 2 wt % the effect no longer augments.

$As_2O_3$ is used as a clarifying agent. If the amount of $As_2O_3$ is less than 0.3 wt % the clarifying effect is insufficient. Increasing the amount of $As_2O_3$ beyond 1 wt % is liable to cause coloring of the glass-ceramic whereas the clarifying effect no longer appreciably augments. It is possible to replace a portion of $As_2O_3$ by $Sb_2O_3$.

In the present invention care should be taken to prevent intrusion of impurities which act as pigments or coloring agents, such as $TiO_2$, $Fe_2O_3$, CoO, NiO, $MnO_2$, etc., since such impurities are detrimental to colorless transparency of the glass-ceramic.

Raw materials for producing a glass-ceramic according to the invention are not particularly specified and can be selected from ones used in producing conventional glasses or glass-ceramics on condition that care is taken to prevent intrusion of impurities of the above described category. For example, it is possible to use quartz powder as the source of $SiO_2$, aluminum hydroxide as the source of $Al_2O_3$, lithium carbonate as the source of $Li_2O$, magnesium carbonate as the source of MgO, zircon sand as the source of $ZrO_2$, zinc oxide as the source of ZnO, aluminum metaphosphate as the source of $P_2O_5$, sodium nitrate as the source of $Na_2O$, barium carbonate as the source of BaO and arsenic oxide as the source of $As_2O_3$.

A glass-ceramic according to the invention is produced by the following process.

A batch of raw materials in proportions according to the aimed glass composition is prepared by a usual mixing operation, and the batch is put into a corrosion resistant vessel such as a platinum crucible and melted to obtain a clear and uniform melt of glass by heating in a suitable furnace such as an electric furnace for 3 to 6 hr at a suitable temperature which usually ranges from 1500° to 1650° C. The molten glass at a temperature of 1500°-1600° C. is formed into a desired shape by a conventional method such as pouring into a mold or rolling out. The shaped glass is subjected to heat treatment for crystallization. The heat treatment may be made during the process of cooling the shaped glass or may alternatively be made after completing the cooling process. It is preferred to accomplish the crystallizing heat treatment as a two-stage treatment consisting of a nucleating treatment as the first stage and a crystallizing treatment as the second stage. The nucleating treatment is made at a temperature ranging from 750° to 800° C. for several hours, and the crystallizing treatment is made at a slightly higher temperature ranging from 800° to 900° C. for several hours.

The invention is further illustrated by the following nonlimitative examples.

EXAMPLES 1-7

The following Table shows seven kinds of glass compositions employed in Examples 1 to 7 of the invention. Comparative Example 4 a single-stage heat treatment was made for crystallization.

The glass-ceramics of Comparative Examples 1, 2 and 4 were subjected to the measurement and visual examination described in the foregoing examples. The results were as shown in the Table. As can be seen, the glass-ceramic of every comparative example was cloudy, and the glass ceramic of Comparative Example 2 had a relatively high coefficient of thermal expansion.

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 3 |
|---|---|---|---|---|---|---|---|---|---|---|---|
| Batch (wt %) | | | | | | | | | | | |
| $SiO_2$ | 66.0 | 66.5 | 66.0 | 68.5 | 63.4 | 68.7 | 63.5 | 72.1 | 67.3 | 59.6 | 65.2 |
| $Al_2O_3$ | 19.7 | 19.8 | 19.8 | 18.0 | 21.6 | 18.0 | 21.5 | 17.3 | 21.2 | 22.0 | 22.3 |
| $Li_2O$ | 4.1 | 3.4 | 3.9 | 3.8 | 4.6 | 4.3 | 4.5 | 3.8 | 2.9 | — | 3.4 |
| MgO | 1.5 | 2.6 | 2.0 | 2.0 | 1.6 | 0.9 | 2.1 | 2.9 | 4.8 | 7.3 | 1.2 |
| ZnO | 1.5 | 1.2 | 1.3 | 1.5 | 1.8 | 0.5 | — | — | — | 2.8 | ($SnO_2$:2.8) |
| $ZrO_2$ | 4.6 | 4.5 | 4.5 | 3.9 | 5.6 | 4.0 | 6.0 | 3.9 | 3.8 | 8.3 | 2.3 |
| $P_2O_5$ | 0.8 | 1.0 | 0.5 | 0.8 | 1.1 | — | 1.6 | — | — | — | 1.3 |
| $Na_2O$ | — | — | 1.0 | — | — | 1.6 | — | — | — | — | 0.5 |
| BaO | 1.0 | 0.5 | 0.5 | 0.8 | — | 1.7 | 0.5 | — | — | — | ($K_2O$:0.7) |
| $As_2O_3$ | 0.3 | 0.5 | 0.5 | 0.7 | 0.3 | 0.3 | 0.3 | — | — | — | 0.3 |
| a/(p + q + r) | 1.02 | 1.03 | 1.01 | 0.92 | 1.00 | 1.05 | 1.06 | 0.86 | 0.98 | 1.01 | 1.56 |
| Heat Treatment (°C. - hr) | 800 - 5 850 - 3 | 780 - 5 830 - 3 | 770 - 5 810 - 3 | 800 - 5 860 - 3 | 750 - 5 800 - 3 | 800 - 5 850 - 3 | 750 - 5 800 - 3 | 800 - 4 900 - 4 | 800 - 4 850 - 4 | — | 840 - 4 |
| Expansion Coefficient ($\times 10^{-7}$/°C.) | −5.4 | 5.0 | 1.6 | −0.5 | 0.5 | −1.0 | −3.0 | 0 | 15 | — | −0.7 |
| Crystal Phases | β-Qtz t-$ZrO_2$ | β-Qtz t-$ZrO_2$ | β-Qtz t-$ZrO_2$ | β-Qtz t-$ZrO_2$ | β-Qtz t-$ZrO_2$ | β-Qtz t-$ZrO_2$ | β-Qtz t-$ZrO_2$ | β-Qtz t-$ZrO_2$ | β-Qtz t-$ZrO_2$ | — | β-Qtz t-$ZrO_2$ $SnO_2$ |
| Appearance | A | A | A | A | B | A | B | C | C | — | D |

In every example, the mixture of raw materials was put into a platinum crucible and melted by heating in an electric furnace for 3-6 hr at a predetermined temperature ranging from 1500° to 1650° C. The molten glass was cast on a heat resistant metal plate and left to cooling to obtain a glass plate. In each example the glass plate was subjected first to a nucleating heat treatment and then to a crystallizing heat treatment. The conditions of the heat treatments are shown in the Table.

In every example, the thermal expansion coefficient of the obtained glass-ceramic was measured over the range of temperature from room temperature to 300° C., and the crystal phase of the glass-ceramic was identified by X-ray diffraction analysis. Besides, the appearance of the glass-ceramic was examined by the naked eye and also under a microscope. The results are shown in the Table, wherein "β-Qtz" means β-quartz and β-eucryptite, and "t-$ZrO_2$" means tetragonal zirconia. As to the appearance of glass-ceramics, "A" means colorless and excellent in transparency, "B" means colorless and transparent, "C" means transparent but slightly cloudy and whitish, and "D" means very cloudy and whitish.

COMPARATIVE EXAMPLES 1-4

As shown in the Table, four kinds of glass compositions not in accordance with the invention were employed as Comparative Examples 1 to 4. In each of these comparative examples, the amount of at least one of the essential components was outside the range specified in the invention. Besides, in Comparative Example 4 $SnO_2$ was used in place of ZnO, and $K_2O$ in place of BaO. Melting of the glass composition, shaping of the molten glass into a glass plate and heat treatment of the glass plate were carried out generally in accordance with the foregoing examples. However, in Comparative Example 3 melting of the glass remained insufficient so that the subsequent processing was omitted, and in

What is claimed is:

1. A transparent and low expansion glass-ceramic, which comprises fine crystals of β-quartz and β-eucryptite crystallized from a glass and dispersed in a glass matrix provided by the uncrystallized part of the glass, the glass consisting essentially of, expressed as oxides,
   63-69 wt % of $SiO_2$,
   18-22 wt % of $Al_2O_3$,
   3-5 wt % of $Li_2O$,
   1-3 wt % of MgO,
   4-6 wt % of $ZrO_2$,
   0-2 wt % of ZnO,
   0-2 wt % of $P_2O_5$,
   0-2 wt % of $Na_2O$,
   0-2 wt % of BaO, and
   0.3-1 wt % of $As_2O_3$,
with the proviso that the inequalities (I) and (II) are both satisfied:

$$\log Z \geq 8.8 - 4.47 \log S \quad \text{(I)}$$

where Z is the content (wt %) of $ZrO_2$ in the glass, and S is the content (wt %) of $SiO_2$ in the glass, $$0.9 \leq a/(p+q+r) \leq 1.1 \quad \text{(II)}$$

where a is the molar fraction of $Al_2O_3$ in the glass, and p, q and r are molar fractions of $Li_2O$, MgO and ZnO in the glass, respectively.

2. A glass-ceramic according to claim 1, wherein the content of ZnO in the glass is not less than 0.5 wt %.

3. A glass-ceramic according to claim 1, wherein the content of BaO in the glass is not less than 0.5 wt %.

4. A glass-ceramic according to claim 1, having a thermal expansion coefficient in the range from $-5 \times 10^{-7}$/°C. to $5 \times 10^{-7}$/°C. over the range of temperature from room temperature to 300° C.

* * * * *